United States Patent [19]

Aoshima et al.

[11] Patent Number: 5,119,385
[45] Date of Patent: Jun. 2, 1992

[54] PARAMETRIC PULSE LASER

[75] Inventors: Shinichiro Aoshima; Hideo Suzuki, both of Shizuoka, Japan

[73] Assignee: Hamamatsu Photonics K. K., Shizuoka, Japan

[21] Appl. No.: 561,981

[22] Filed: Aug. 1, 1990

[30] Foreign Application Priority Data

Aug. 3, 1989 [JP] Japan .................. 1-202220
Sep. 22, 1989 [JP] Japan .................. 1-247282

[51] Int. Cl.$^5$ ............................................ H01S 3/108
[52] U.S. Cl. .................................. 372/23; 372/21; 372/25; 372/101; 372/102; 359/330; 385/123
[58] Field of Search ............... 372/21, 25, 102, 23, 372/18, 101, 10; 307/425, 478; 350/96.29, 30

[56] References Cited

U.S. PATENT DOCUMENTS

| | | | |
|---|---|---|---|
| 3,720,884 | 3/1973 | Kelley et al. | 372/25 |
| 4,200,846 | 4/1980 | Stark, Jr. et al. | 372/25 |
| 4,250,465 | 2/1981 | Leib | 372/21 |
| 4,349,907 | 9/1982 | Campillo et al. | 372/21 |
| 4,639,923 | 1/1987 | Tang et al. | 372/21 |
| 4,764,930 | 8/1988 | Bille et al. | 372/23 |
| 4,914,663 | 4/1990 | Basu et al. | 372/18 |

FOREIGN PATENT DOCUMENTS 0233416 9/1989 Japan .................. 372/21

OTHER PUBLICATIONS

Piskarskas et al., "New Instruments and Measurement Methods", Sov. Phys. Usp., 29(9), Sep. 1986, pp. 869-879.
Wachman et al., "Continuous-Wave Mode-Locked and Dispersion-Compensated Femtosecond Optical Parametric Oscillator", Optics Letters, vol. 15, No. 2, Jan. 15, 1990, pp. 136-138.
Vasilyauskas et al., "Self-Compression of Femtosecond Light Pulses in Media with a Quadratric Nonlinearity Under Conditions of a Group Velocity Mismatch", Sov. J. Quantum Electron, 18(4), Apr. 1988, pp. 518-521.
Piskarskas et al., "Picosecond Optical Parametric Oscillator Pumped by Temporally Compressed Pulses From a Q-Switched, Mode-Locked, CW-Pumped Nd: YAG Laser", Optics Letters, Jun. 1, 1989, vol. 14, No. 11, pp. 557-559.
Vanherzeele et al., "Widely Tunable Parametric Generation in Beta Barium Borate", Applied Optics, vol. 27, No. 13, Jul. 1988, pp. 2634-2636.
Fan et al., "Visible BaB204 Optical Parametric Oscillator Pumped at 3565 nm by a Single-Axial-Mode Pulsed Source", Appl. Phys. Lett., 53(21), Nov. 1988, pp. 2014-2016.
Burdulis et al., "Visible Optical Parametric Oscillation in Synchronously Pumped Beta-Barium Borate", Optics Communications, vol. 74, No. 6, Jan. 1990, pp. 398-402.
Edelstein et al., "Broadly Tunable High Repetition Rate Femtosecond Optical Parametric Oscillator," Appl. Phys. Lett., 54(18), May 1989, pp. 1728-1730.
Cheng et al., "Broadly Tunable Optical Parametric Oscillation in $\beta$-Bab204", Appl. Phys. Lett., 53(3), Jul. 1988, pp. 175-177.
A. Piskarskas et al., "Parametric Chirp and 20-Fold Compression of Pulses From a Quasi-cw Picosecond Optical Parametric Oscillator", Sov. J. Quantum Electron., vol. 15, No. 11, Nov., 1985, pp. 1539-1541.
L. J. Bromley et al., "Synchronously Pumped Optical Parametric Oscillation in Beta-Barium Borate", Optics Communications, vol. 67, No. 4, Jul. 15, 1988, pp. 316-320.
H. Itoh et al., "Optical Pulse Compression in 1.5 $\mu$m Wavelength Region Using Large-Positive-Dispersion Fibre and Grating Pair", vol. 24, No. 13, Jun. 23, 1988, pp. 785-786.

Primary Examiner—William L. Sikes
Assistant Examiner—Susan S. Morse
Attorney, Agent, or Firm—Finnegan, Henderson, Farabow, Garrett, and Dunner

[57] ABSTRACT

Light input means inputs exciting pulse light beams to a parametric oscillator simultaneously in a plurality of directions. The parametric oscillator including a parametric element such as a urea crystal produces parametric pulse beams having different wavelengths. The parametric pulse beams are corrected into coaxial beams by a correcting optical means which includes an optical fiber, and then group dispersion of the coaxial beams are compensated for by a group dispersion compensating means which includes opposed diffraction gratings.

19 Claims, 5 Drawing Sheets

LONGER WAVELENGTH   SHORTER WAVELENGTH

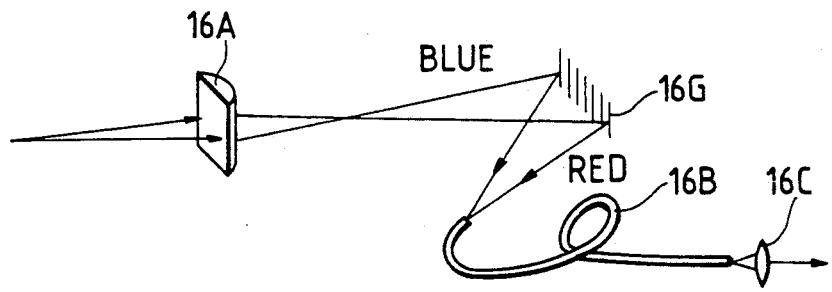
FIG. 9
FIG. 10
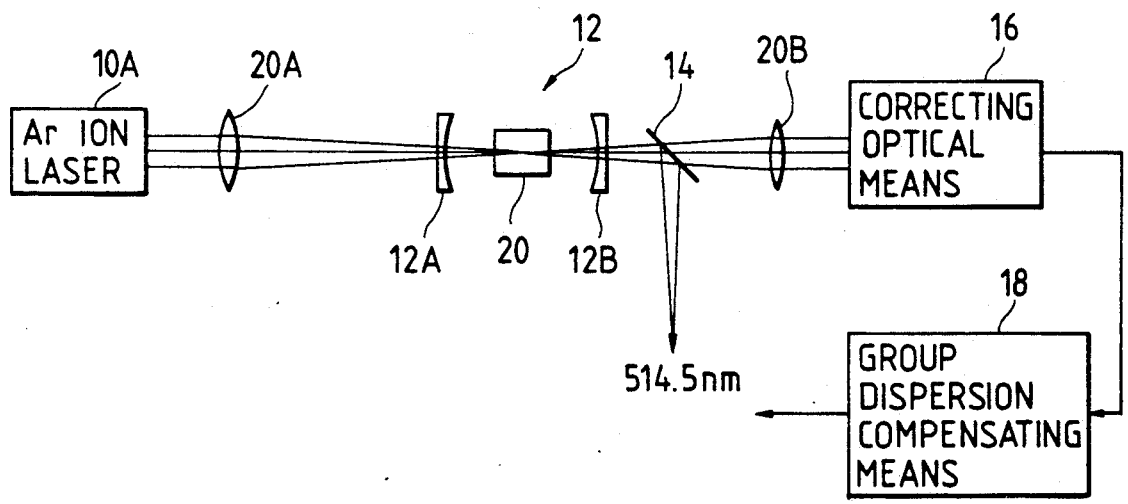
FIG. 11

PARAMETRIC PULSE LASER

BACKGROUND OF THE INVENTION

This invention relates to a parametric pulse laser.

In order for information to be transmitted at enhanced density and resolution in optical communications, the width of light pulses emitted from lasers has to be reduced as much as possible.

One of the techniques commonly employed to oscillate pulse lasers is to input pulse light to a parametric element so that parametric pulse light is obtained. In such parametric pulse lasers, visible light having a frequency of $\nu_1$ and infrared light having a frequency of $\nu_2$ are produced as optical outputs when ultraviolet light having a frequency of $\nu_0$ is supplied as an optical input, and the relationship $\nu_0 = \nu_1 + \nu_2$ holds in this case.

Conventional parametric pulse lasers are only capable of converting wavelength of the input light, and the width of output light pulses cannot be made substantially shorter than that of the input pulse light.

SUMMARY OF THE INVENTION

An object, therefore, of the present invention is to provide a parametric pulse laser that is capable of producing shorter light pulses in output light without causing its dispersion.

This object of the present invention can be attained by a parametric pulse laser comprising a parametric oscillator, light input means which permits pulse light beams to be input to said parametric oscillator simultaneously in multiple directions, correcting optical means which corrects the multi-wavelength pulse light beams from said parametric oscillator into coaxial beams, and group dispersion compensating means which compensates for the group dispersion of the pulse light beams from said correcting optical means.

BRIEF DESCRIPTION OF THE DRAWINGS

FIG. 9 is a perspective view showing a correcting optical means used in a fifth embodiment of the present invention;

FIG. 10 is a view showing a profile of parametric oscillation light in the fifth embodiment;

FIG. 11 is a block diagram showing a parametric pulse laser according to a sixth embodiment of the present invention;

DETAILED DESCRIPTION OF THE PREFERRED EMBODIMENTS

When light having a frequency of $\nu_0$ is input to an optical parametric element, frequencies of optical outputs $\nu_1$ and $\nu_2$ can be varied, with the relationship $\nu_0 = \nu_1 + \nu_2$ being held, by adjusting the incident angle of the input light. For instance, when ultraviolet light having a frequency of $\nu_0$ is input to an optical parametric element made of a urea crystal, wavelength of the output visible light having a frequency $\nu_1$ shifts to the longer range and wavelength of the output infrared light having a frequency $\nu_2$ shifts to the shorter range, as the angle formed between the input ultraviolet light and the optic axis of the urea crystal is reduced from 90 degrees.

Hence, by inputting the light beams of $\nu_0$ to the crystal simultaneously in multiple directions, multi-wavelength output light beams can be obtained simultaneously for each of the frequencies $\nu_1$ and $\nu_2$.

Figure 13:
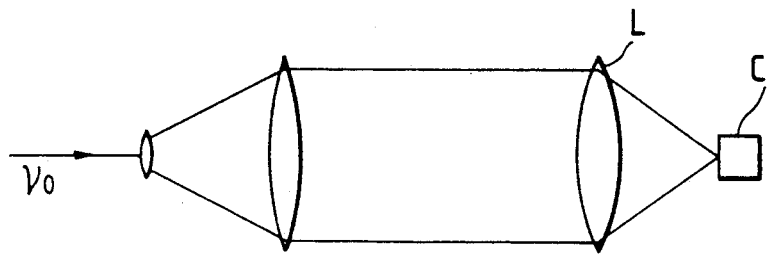
FIG. 13 is a schematic cross-sectional view showing how incident light is input to a crystal.

In order to realize the simultaneous incidence of the light beams of $\nu_0$ in multiple directions, one may cause a beam of $\nu_0$ to spread and then converge spread beams sharply with a lens before they are input to a crystal C, as shown in FIG. 13.

Figure 14A:
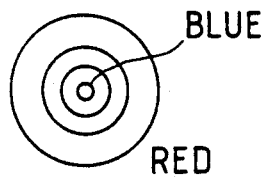
FIGS. 14A and 14B are views showing profiles of parametric oscillation light in the case shown in FIG. 13.
Figure 14B:
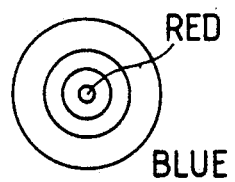

The above relationship between the input and output beams depends upon the angle at which the crystal for the optical parametric element is cut. When ultraviolet light beams having the wavelength $\nu_0$ are input simultaneously in multiple directions to the crystal cut at a particular angle, a visible light output having the wavelength $\nu_1$ may be produced as shown in FIG. 14A or 14B. As FIG. 14A shows, the output light from a parametric element made of a urea crystal has an inner blue region and an outer red region, with the wavelength increasing from the center outward. On the other hand, as FIG. 14B shows, the output light from a parametric element made of a $\beta$-BaB$_2$O$_4$ crystal has an inner red region and an outer blue region, with the wavelength decreasing from the center outward.

Further, not only visible light having the frequency $\nu_1$ but also infrared light having the frequency $\nu_2$ will be produced when the incident light is ultraviolet light beams having the frequency $\nu_0$, and the resulting output light has a wavelength profile reverse to one shown in FIG. 14A or 14B.

In accordance with the present invention, the multi-wavelength pulse light beams emitted from the parametric oscillator are corrected into coaxial beams by a correcting optical means, and the coaxial pulse light beams from this correcting optical means is compensated by a group dispersion compensating means to produce pulse light beams consisting of shorter pulses. For instance, if the frequency range of light beams having the frequencies $\nu_1$ and $\nu_2$ are written as $\Delta\nu_1$ and $\Delta\nu_2$, respectively, the resulting light pulses have pulse widths on the order of $1/\Delta\nu_1$ and $1/\Delta\nu_2$, respectively.

Embodiments of the present invention are described below in detail with reference to FIGS. 1–12.

Figure 1:
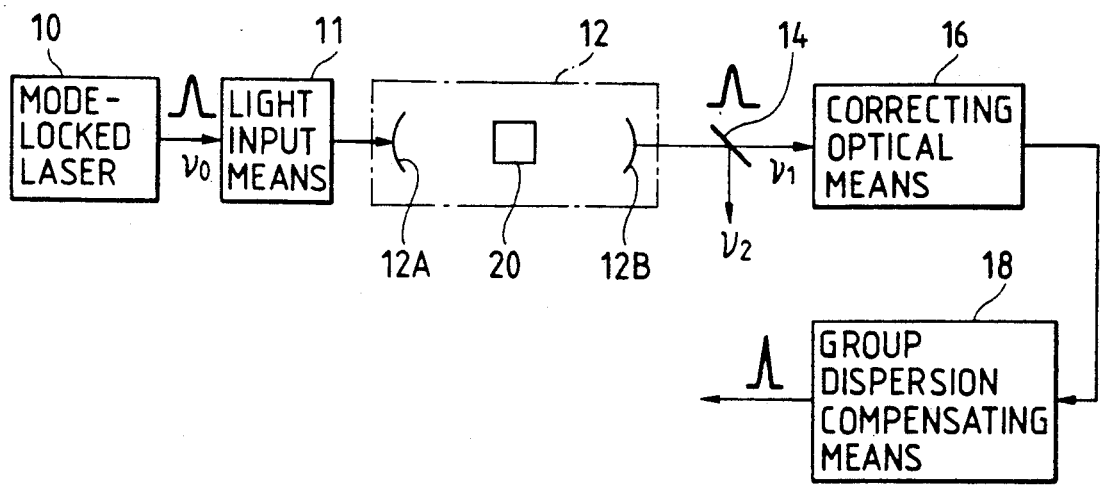
FIG. 1 is a block diagram showing a parametric pulse laser according to a first embodiment of the present invention.

A first embodiment of the present invention is shown in FIG. 1 and provides a parametric pulse laser which comprises: an exciting mode-locked laser 10 that outputs exciting laser light; a light input means 11 composed of lenses and other elements for inputting the beams of exciting pulse laser light to a parametric oscillator 12 in multiple directions; the parametric oscillator 12 for generating wavelength-converted multi-wavelength pulse laser light; a dichroic mirror 14 for rejecting a component of frequency $v_2$ from the pulse light emitted from the parametric oscillator 12; a correcting optical means 16 for correcting the component of wavelength $v_1$ passing through the dichroic mirror 14 so as to produce coaxial pulse light; and a group dispersion compensating means 18 that compensates for the group dispersion of the light pulses output from the correcting optical means 16.

An example of the light input means is the lens system shown in FIG. 13, which is already described above.

The parametric oscillator 12 is composed of a parametric element 20 positioned between a resonator mirror 12A and an output mirror 12B. The resonator length of the parametric oscillator 12 is designed to be an integral multiple or a reciprocal of an integer of the resonator length of the exciting mode-locked laser 10.

Figure 2:
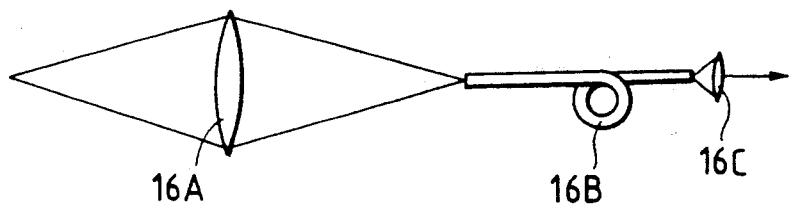
FIG. 2 is a schematic side view showing a correcting optical means used in the first embodiment.

As shown in FIG. 2, the correcting optical means 16 is composed of a non-dispersive lens 16A, an optical fiber 16B and another non-dispersive lens 16C.

In the first embodiment of the present invention, the non-dispersive lenses 16A and 16C are formed of a non-dispersive medium, so even if they are shaped like ordinary convex lenses, they are capable of focusing the beams of multi-wavelength light on one point or collimating multi-wavelength light diverging from a single point. Since it is difficult in practical applications to fabricate an optical medium that is non-dispersive over a broad range of wavelengths, it is recommended to use achromatic lenses each consisting of the combination of several dispersive media.

In the first embodiment described above, the non-dispersive lenses 16A and 16C may be formed of an ordinary optical medium to have an aspheric surface so that the lens is capable of focusing on one point the light in a blue to red wavelength range which depends on a crystal constituting the parametric element 20, or capable of collimating such light from one point.

Figure 3:
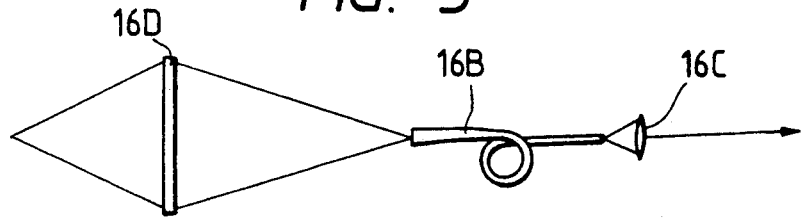
FIGS. 3 and 4 are schematic side views showing correcting optical means used in a second and a third embodiment of the present invention.

FIG. 3 shows a second embodiment of the present invention, in which the non-dispersive lens 16A in the correcting optical means 16 is replaced by a Fresnel lens 16D. The Fresnel lens 16D should be so designed that the pitch between annular segments varies in the radial direction to insure that the visible light in a blue to red range which depends on a crystal constituting the parametric element 20 is focused on one point.

Figure 4:
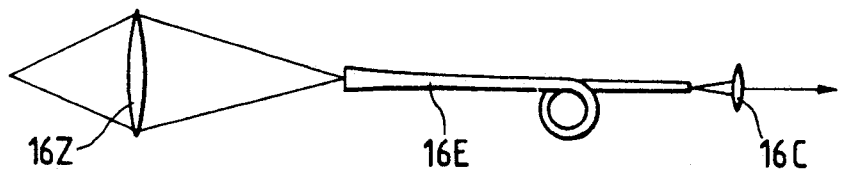

Alternatively, the correcting optical means 16 may employ a usual dispersive lens 16Z and a tapered optical fiber 16E as in the third embodiment shown in FIG. 4.

Figure 5:
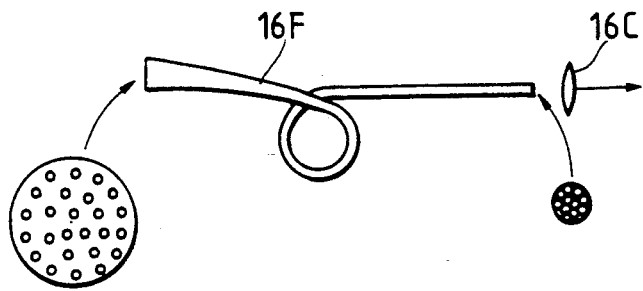
FIG. 5 is a schematic side view showing a correcting optical means used in a fourth embodiment of the present invention.

If desired, in order to avoid the propagation mode dispersion, the tapered optical fiber 16E may be replaced by a bundle of single-mode fibers to form a tapered optical fiber 16F as in the fourth embodiment shown in FIG. 5.

We now describe the group dispersion compensating means 18.

Figure 6:
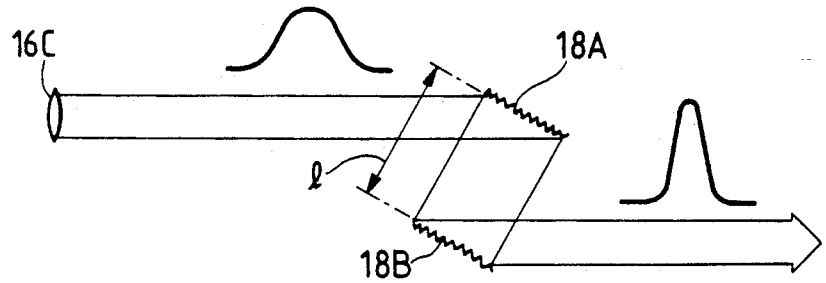
FIG. 6 is a plan view showing an example of a group dispersion compensating means used in the present invention.
Figure 7:
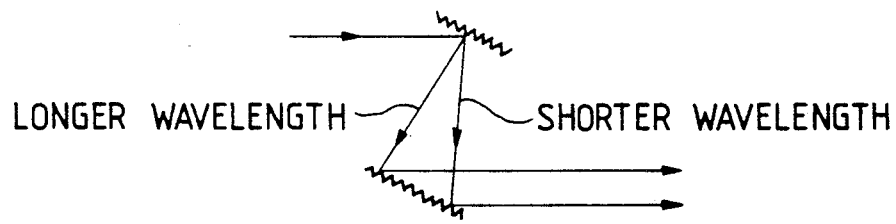
FIG. 7 is a plan view showing an optical path in a pair of diffraction gratings.
Figure 8:
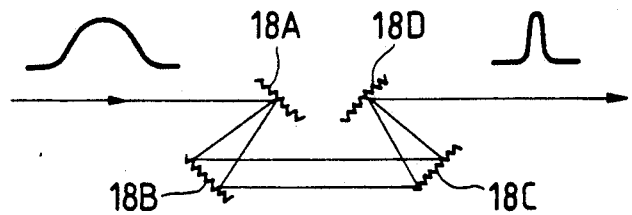
FIG. 8 is a plan view showing another example of the group dispersion compensating means used in the present invention.

Consider the case where the dispersive effect of the optical fiber in the correcting optical means 16 causes a component of the longer wavelength to come earlier than a component of the shorter wavelength. As a countermeasure to this, two diffraction gratings 18A and 18B are arranged parallel to each other as shown in FIG. 6. The operating principle employed in this arrangement is that light having the shorter wavelength travels over a shorter optical path than light having the longer wavelength, as shown in FIG. 7. By optimizing the distance 1 between the gratings 18A and 18B, the light pulses of different wavelengths can be well timed. In this way, the wideband light generated from the parametric oscillator 12, whose frequency range may have spread to $\Delta v_1$, can be converted to light of short pulses on the order of $1/\Delta v_1$. Similarly, four gratings 18A–18D may be used as shown in FIG. 8. Compared to the case of FIG. 6 where two gratings are used, the embodiment shown in FIG. 8 has the advantages that an incident beam will not spread but instead is produced as an output beam having the same diameter, and that the distance between opposed gratings is halved.

If desired, a pair of triangular prisms or four triangular prisms that operate on the same principle as described above may be used as the group dispersion compensating means 18.

Alternatively, an optical fiber having a reverse dispersion to the fiber used in the correcting optical means 16 may be used. In this alternative case, the two fibers can be directly coupled to obviate the need for the non-dispersive lens 16C.

In the embodiments described above, the mode-locked laser 10 is used as a light source for exciting the parametric element 20. It should, however, be noted that this is not the sole example of the exciting light source that can be used in the present invention and another source such as a Q-switched laser may be used. If a Q-switched laser is used, there is no need to insure that the resonator length of the parametric oscillator 12 is either an integral multiple or a reciprocal of an integer of the resonator length of the exciting laser.

A fifth embodiment of the present invention is shown in FIG. 9. In this embodiment, the light input means 11 includes a cylindrical lens (in the example of FIG. 13, only the lens L is made cylindrical), and the correcting optical means 16 includes a cylindrical lens 16A and a reflection grating 16G. In this case, the crystal optic axis of the parametric element 20 is selected in such a way that the output light $v_1$ from the parametric element 20, which has been focused by the cylindrical lens of the light input means 11 and wavelength-converted by the parametric element 20, will have a wavelength profile as shown in FIG. 10. If the grating pitch of the grating 16G is optimized, the visible light reflected from that grating will converge at one point irrespective of its color, as shown in FIG. 9. The same is true with the case where a transmission grating is used in place of the reflection grating.

The pulse light is focused by the reflection grating 16G or a transmission grating on one end of either the optical fiber or the tapered fiber which are already described above.

Although the fifth embodiment of FIG. 9 only includes the single optical fiber 16B, it is preferable, to more effectively utilize the parametric output light, to employ linearly arranged optical fibers. In this case, the non-dispersive lens 16C is also made cylindrical.

The grating described above may be replaced by a triangular prism. If desired, such a grating and triangular prism may be adapted to also work as part of the group dispersion compensating means 18.

A sixth embodiment of the present invention is shown in FIG. 11. In this embodiment, a $\beta$-BaB$_2$O$_4$ crystal having a phase-matching angle ($\theta$) of 23.1 degrees is used as the parametric element 20 and an Ar ion laser 10A is used as an exciting pulse light source. The parametric element 20 is excited by pulse laser light generated from the Ar ion laser 10A at a wavelength of 514.5 nm. Shown by numerals 20A and 20B are lenses.

Figure 12:
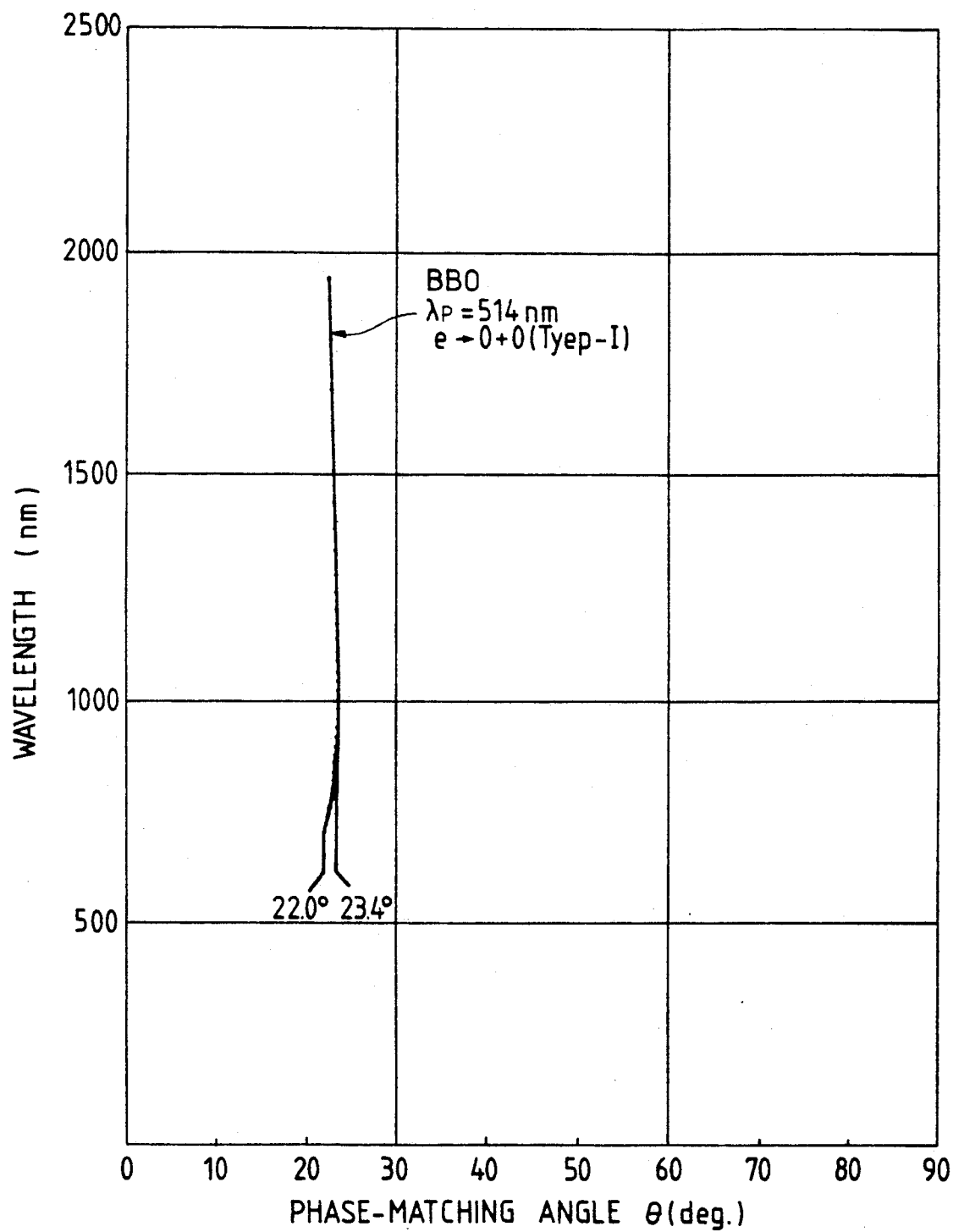
FIG. 12 is a graph showing the relationship between the phase-matching angle and oscillating wavelength of a parametric element used in the sixth embodiment.

The $\beta$-BaB$_2$O$_4$ crystal has the characteristic shown in FIG. 12, so by merely allowing the output beam from the Ar ion laser 10A to be weakly focused, wideband coherent light containing two components of frequencies $\nu_1$ and $\nu_2$ in the wavelength range of 800–1440 nm can be obtained at a time at a phase-matching angle of 23.1±0.3 degrees, and this offers the advantage that there is no need to separate the two light components $\nu_1$ and $\nu_2$. It should be noted here that similar results can be attained even if the mode-locked laser 10 is used in place of the Ar ion laser 10A.

In the foregoing embodiments except for the sixth embodiment of FIG. 11, the component of frequency $\nu_1$ of the pulse light from the parametric oscillator 12 is converted to short pulses, but desired short pulses can also be obtained from the light component of frequency $\nu_2$ by arranging the correcting optical means and the group dispersion compensating means for the component of $\nu_2$ in the same manner as described above.

In the case where the Fresnel lens as the correcting optical means 16 with respect to the light component of $\nu_1$, the pitch in the Fresnel lens 16D should be varied from ordinary Fresnel lenses; if the parametric element 20 is composed of a urea crystal, the pitch should increase from the center outward, and if the element 20 is made of a $\beta$-BaB$_2$O$_4$ crystal, the pitch should decrease from the center outward. A Fresnel lens having a reverse profile of pitches need to be used for the light component having the frequency $\nu_2$ to obtain short pulses. In this case, too, the duration of pulses can be reduced down to about 1/$\Delta\nu_2$. Accordingly, ultrashort light pulses can be obtained whether the frequency of light is $\nu_1$ or $\nu_2$.

In the foregoing embodiments, an optical fiber is used in the correcting optical means 16 but, if desired, this may be replaced by a fiber amplifier which amplifies the parametric pulse light before it is input to the group dispersion compensating means 18.

Having the construction described above, the parametric pulse laser of the present invention offers the outstanding advantage that wavelength-converted laser light pulses shorter than the original light pulses can be produced with high efficiency.

What is claimed is:

1. A parametric pulse laser comprising:
   a pulse laser source for emitting a pulse laser beam;
   light input means for receiving the pulse laser beam and inputting exciting pulse light beams to a parametric oscillator simultaneously in a plurality of directions;
   the parametric oscillator including a parametric element, for producing parametric pulse light beams having different wavelengths;
   correcting optical means for correcting the parametric pulse light beams into coaxial pulse light beams; and
   group dispersion compensating means for compensating for group dispersion of the coaxial pulse light beams.

2. A parametric pulse laser according to claim 1, wherein the pulse light source is a mode-locked laser.

3. A parametric pulse laser according to claim 2, wherein resonator length of the parametric oscillator is adjusted to an integral multiple or a reciprocal of an integer of resonator length of the mode-locked laser.

4. A parametric pulse laser according to claim 1, wherein the pulse light source is a Q-switched laser.

5. A parametric pulse laser according to claim 1, wherein the light input means produces the exciting pulse light beams by first spreading the pulse laser beam and then sharply focusing the spread pulse laser beams.

6. A parametric pulse laser according to claim 1, wherein the parametric element is a urea crystal.

7. A parametric pulse laser according to claim 1, further comprising splitting means for splitting the parametric pulse light beams to eliminate part thereof.

8. A parametric pulse laser according to claim 7, wherein the splitting means is a dichroic mirror.

9. A parametric pulse laser according to claim 1, wherein the correcting optical means comprises an optical fiber, a first non-dispersive lens for focusing the parametric pulse light beams on one end of the optical fiber, and a second non-dispersive lens for collimating the parametric pulse light beams output from the optical fiber to obtain the coaxial pulse light beams.

10. A parametric pulse laser according to claim 9, wherein the optical fiber is a tapered optical fiber.

11. A parametric pulse laser according to claim 9, wherein the optical fiber is a tapered fiber including a bundle of single-mode optical fibers.

12. A parametric pulse laser according to claim 1, wherein the correcting optical means comprises an optical fiber, a Fresnel lens for focusing the parametric pulse light beams on one end of the optical fiber, and a non-dispersive lens for collimating the parametric pulse light beams output from the optical fiber to obtain the coaxial pulse light beams.

13. A parametric pulse laser according to claim 1, wherein the group dispersion compensating means comprises opposed diffraction gratings arranged in parallel.

14. A parametric pulse laser according to claim 13, wherein a plurality of the opposed diffraction gratings are arranged in series.

15. A parametric pulse laser according to claim 1, wherein the light input means produces the exciting pulse light beams which are linearly focused on the parametric element; and the correcting optical means comprises linearly arranged optical fibers, a first cylindrical lens for focusing the parametric pulse light beams, a diffraction grating for focusing the parametric pulse light beams from the first cylindrical lens on input ends of the linearly arranged optical fibers, and a non-dispersive cylindrical lens for collimating the parametric pulse light beams output from the linearly arranged optical fibers to obtain the coaxial pulse light beams of oblong shape.

16. A parametric pulse laser according to claim 15, wherein the light input means comprises a second cylindrical lens.

17. A parametric pulse laser according to claim 1, wherein the parametric element is a $\beta$-BaB$_2$O$_4$ crystal which has a phase matching angle of about 23.1 degrees.

18. A parametric pulse laser according to claim 17, wherein the pulse laser source is an Ar ion laser.

19. A parametric pulse laser according to claim 1, wherein the correcting optical means comprises a fiber amplifier for amplifying the parametric pulse light beams.

* * * * *